(12) United States Patent
Hundal et al.

(10) Patent No.: US 7,133,686 B2
(45) Date of Patent: Nov. 7, 2006

(54) SYSTEM AND METHOD FOR IDENTIFYING INTERFERES IN A COMMUNICATION SPECTRUM

(75) Inventors: Sukhdeep S. Hundal, Delta (CA); Milosh Koprivica, Richmond (CA)

(73) Assignee: VTech Telecommunication Limited, Hong Kong (HK)

( * ) Notice: Subject to any disclaimer, the term of this patent is extended or adjusted under 35 U.S.C. 154(b) by 517 days.

(21) Appl. No.: 10/338,011

(22) Filed: Jan. 8, 2003

(65) Prior Publication Data

US 2004/0132410 A1 Jul. 8, 2004

(51) Int. Cl.
*H04Q 7/20* (2006.01)
*H04B 17/00* (2006.01)

(52) U.S. Cl. ................ 455/465; 455/426.1; 455/226.1

(58) Field of Classification Search ............ 455/426.1, 455/426.2, 67.11, 67.14, 67.7, 226.1, 226.2, 455/465, 1
See application file for complete search history.

(56) References Cited

U.S. PATENT DOCUMENTS

| | | | | |
|---|---|---|---|---|
| 5,148,548 A | * | 9/1992 | Meche et al. | 455/514 |
| 5,594,946 A | * | 1/1997 | Menich et al. | 455/522 |
| 5,621,417 A | * | 4/1997 | Hassan et al. | 342/457 |
| 5,740,537 A | * | 4/1998 | Beming et al. | 455/450 |
| 6,760,671 B1 | * | 7/2004 | Batcher et al. | 702/60 |
| 6,873,825 B1 | * | 3/2005 | Pattabiraman | 455/41.2 |
| 6,873,845 B1 | * | 3/2005 | Hanly | 455/436 |
| 2003/0109234 A1 | * | 6/2003 | Shi | 455/116 |
| 2004/0063403 A1 | * | 4/2004 | Durrant | 455/41.2 |

FOREIGN PATENT DOCUMENTS

WO    WO 03/063532    7/2003

OTHER PUBLICATIONS

GB Search Report dated Jun. 17, 2004.

* cited by examiner

*Primary Examiner*—Tilahun Gesesse
(74) *Attorney, Agent, or Firm*—Pillsbury Winthrop Shaw Pittman LLP

(57) ABSTRACT

A method for identifying interferers in a radio communication band, such as the 2.4 GHz ISM band, uses a priori information of the interferers such as channel structure, channel frequency and channel bandwidth. Measured RSSI can be used to detect and identify interferers. RSSI measurements can be made at multiple frequencies within a channel of the interferer. Randomization of RSSI measurements improves the likelihood of interferer detection and identification if such interferer is present. Metrics other than RSSI can be used.

32 Claims, 4 Drawing Sheets

SYSTEM AND METHOD FOR IDENTIFYING INTERFERES IN A COMMUNICATION SPECTRUM

BACKGROUND

1. Field of the Invention

Embodiments of the present invention relate generally to the field of interference mitigation in the frequency spectrum commonly used by cordless telephones. More particularly, embodiments of the present invention relate to the field of identifying of interferers in a cordless telephone system spectrum.

2. Background of the Invention

Cordless telephone products today often use the license-free 2.4 GHz ISM communication spectrum. However, a number of other technologies also use this spectrum. For example, 802.11b WLAN products and other products use this spectrum. The presence of such devices cause interference with communication between the cordless telephone handset and the cordless telephone base unit. Likewise, communication between the cordless telephone base unit and the cordless telephone handset causes interference with communication occurring in other products operating in the 2.4 GHz ISM spectrum. As a result of this cross-interference, the performance of these products is often degraded.

To mitigate the effects of interference, conventional cordless telephone devices allow users to manually change channels when interference degrades communication. Other conventional cordless telephone devices automatically switch channels if a detected bit error rate exceeds a threshold. Neither approach is optimal. A better approach is to identify the interferer and then use the identification information to mitigate the effects of the interference.

However, there are problems associated with detecting the presence of such interferers in cordless telephone system communications that must be overcome for a viable solution applicable to the cordless telephone environment. One such problem is detecting the presence of the interferer in a short time. A second problem is distinguishing one interferer from another, for example, distinguishing 802.11b from other interferers in the ISM band.

BRIEF SUMMARY OF THE INVENTION

Embodiments of the present invention provide fast detection and identification of interferers in a radio communication band, such as 802.11b in the 2.4 GHz ISM band. Fast detection and identification of such interferers allows a cordless telephone system according to an embodiment of the present invention to adapt quickly to avoid mutual interference. For example, in one embodiment of the present invention, a method uses known information about interferers of interest to increase the speed of detection and identification. Because the method uses information unique to the interferer-of-interest for its detection and identification, the present invention provides an ability to distinguish different types of interferers. The method determines a metric by which the interferer-of-interest can be identified. For example, one such metric is received signal strength indicator (RSSI). The RSSI is measured at a frequency in a channel in which the interferer-of-interest is liked to be found. Using RSSI, the interferer-of-interest is deemed present if the metric is satisfied. Because the frequency at which to make the RSSI measurement is chosen where the interferer is likely to be found, detection of an interferer at that frequency also provides identification of the interferer.

For example, where the interferer is 802.11b, embodiments of the present invention provide fast detection and identification of 802.11b using known factors of the 802.11b signal, such as channel frequency and bandwidth of the 802.11b signal to measure received signal strength indication (RSSI) on selected channels. In addition, the method makes use of the frequency separation of blocked channels from known 802.11b channels for positive identification of 802.11b presence. The method also provides an ability to distinguish 802.11b interference from other types of interference, which can be used in systems that attempt to mitigate interference based on knowledge of the identity of the interferer.

In one embodiment, the present invention is a method for identifying an interferer in a radio communication band. The method includes selecting a plurality of test channels in accordance with a channel structure of the interferer and selecting a frequency in each selected channel. An RSSI associated with the selected frequency in each selected channel is measured and the interferer using information corresponding in accordance with the measured RSSIs is identified in accordance with the measured RSSIs.

In another embodiment, the present invention is a cordless telephone system for identifying an interferer. The cordless telephone system includes a handset and a base unit in communication with the handset. A receiver receives a signal centered at a frequency, which is selected in accordance with known characteristics about the interferer. A microprocessor is configured to measure an RSSI corresponding to the frequency, to compare the measured RSSI to a predetermined RSSI threshold and to indicate that the interferer is present when the measured RSSI exceeds the predetermined RSSI. The receiver can be in one or both of the handset and the base unit. Likewise, the microprocessor can be in one or both of the handset and the base unit.

DETAILED DESCRIPTION OF THE INVENTION

Embodiments of the present invention positively identify interferers in a radio communication band, such as a radio communication band used by cordless telephones. Interferers are interference signals that can cause disruptions in communication between a cordless telephone handset and its base unit. An exemplary interferer is the 802.11b used in many WLAN systems in the 2.4 GHz ISM band. Such identification facilitates the ability to modify cordless telephone system operation so that cordless telephones operating in the 2.4 GHz ISM band can interoperate with devices that generate such interferers better than is possible using conventional cordless telephones. Using known information about the interferer, such as channel frequency and bandwidth, embodiments of the present invention achieve fast, reliable interferer detection. Because known interferer characteristics are used to determine the interferer, detection of the interferer also serves to identify the interferer.

Any wideband interferer having known channel characteristics, such as known channel structures, channel frequencies and channel bandwidths can be identified using embodiments of the present invention. An exemplary such wideband interferer is the 802.11b signal. The channel structure for 802.11b is well known. In North America, for example, the 802.11b spectrum ranges from 2400 MHz to 2483 MHz. This spectrum is divided into 11 channels from 2412 MHz to 2462 MHz. The channels are spaced 5 MHz apart. Each channel has a 22 MHz wide bandwidth. As a result, there is large overlap of channels. For example, channel 1 is centered at 2412 MHz, but extends from 2401 MHz to 2433 MHz. Channel 6 is centered at 2437 MHz, but extends from 2426 MHz to 2448 MHz.

Figure 1:
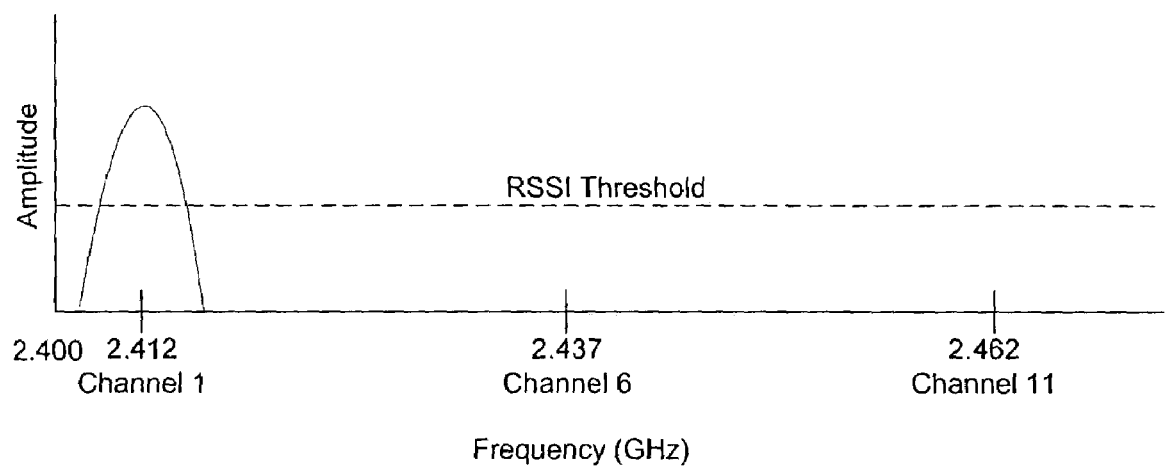
FIG. 1 illustrates an exemplary spectrum in the 2.4 GHz ISM band.

FIG. 1 illustrates an exemplary spectrum in the 2.4 GHz ISM band. As shown, an 802.11b signal is present in channel 1, but not channels 6 or 11. As a result, if a cordless telephone capable of operating in the 2.4 GHz ISM band is operated at a frequency that overlaps with channel 1 of the 802.11b in this case, significant interference and degradation of performance of both the 802.11b device and the cordless telephone is likely to occur.

Figure 2:
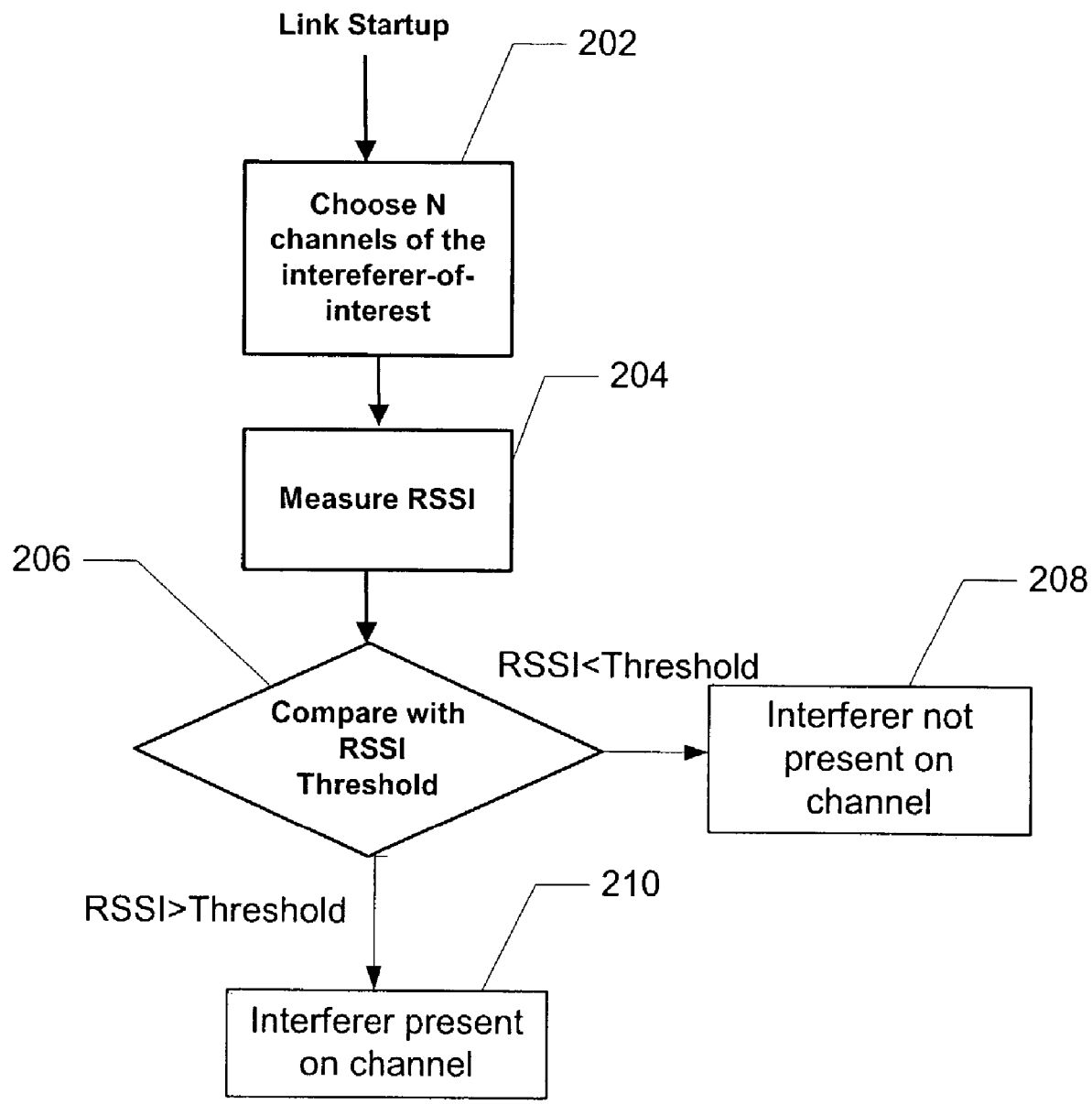
FIG. 2 is a flow chart for a method for identifying an interferer in a communication channel according to an embodiment of the present invention.

FIG. 2 is a flow chart for a method for identifying an interferer in a communication channel according to an embodiment of the present invention. In step 202, N channels in which the interferer is likely to operate are chosen. For example, three channels of 802.11b (channels 1, 6 and 11) can be chosen in step 202. Any N channels can be selected. Selection can be by the user or predetermined.

In step 203, a frequency is selected in each channel at which to determine a received signal strength indication (RSSI). The frequency can be selected using a priori knowledge of the interferer such as channel structure, channel frequency and channel bandwidth.

In step 204, the RSSI is measured at each of the selected frequencies. In one embodiment of the present invention, RSSI is measured by tuning the receiver to each particular channel (or frequency) for a short period of time. Any interferers present within the tuning bandwidth are downconverted to intermediate frequency by the receiver. A received signal strength indication (RSSI) is measured at the downconverted intermediate frequency.

The measured RSSI for each frequency is compared to a threshold. The threshold can be predetermined or dynamically adjustable. A dynamically adjustable threshold allows the present invention to be adjusted for a particular environment. If the measured RSSI for a particular channel exceeds the threshold (determined in step 206), the interferer is deemed present in the channel as shown in step 210. In FIG. 1, for example, the signal present in channel 1 exceeds an exemplary RSSI threshold. If the measured RSSI for a particular channel is less than a threshold in the selected bandwidth (determined in step 206), the interferer is deemed not present in the channel as shown in step 208.

In the case of 802.11b, for example, RSSI can be measured at a selected frequency in channel 1 of the 802.11b structure described above. If the RSSI measured at the selected channel 1 frequency exceeds a threshold, 802.11b is identified in channel 1.

System performance can be improved by selecting multiple frequencies per channel, and performing the RSSI analysis using the multiple selected frequencies. Any number of frequencies can be chosen. Using fewer frequencies in the analysis provides faster results. However, the gathered information has a higher chance of error. Using more frequencies in the analysis provides a more accurate view of the channel, and consequently reduces the number of false identifications of the presence of an interferer.

Figure 3:
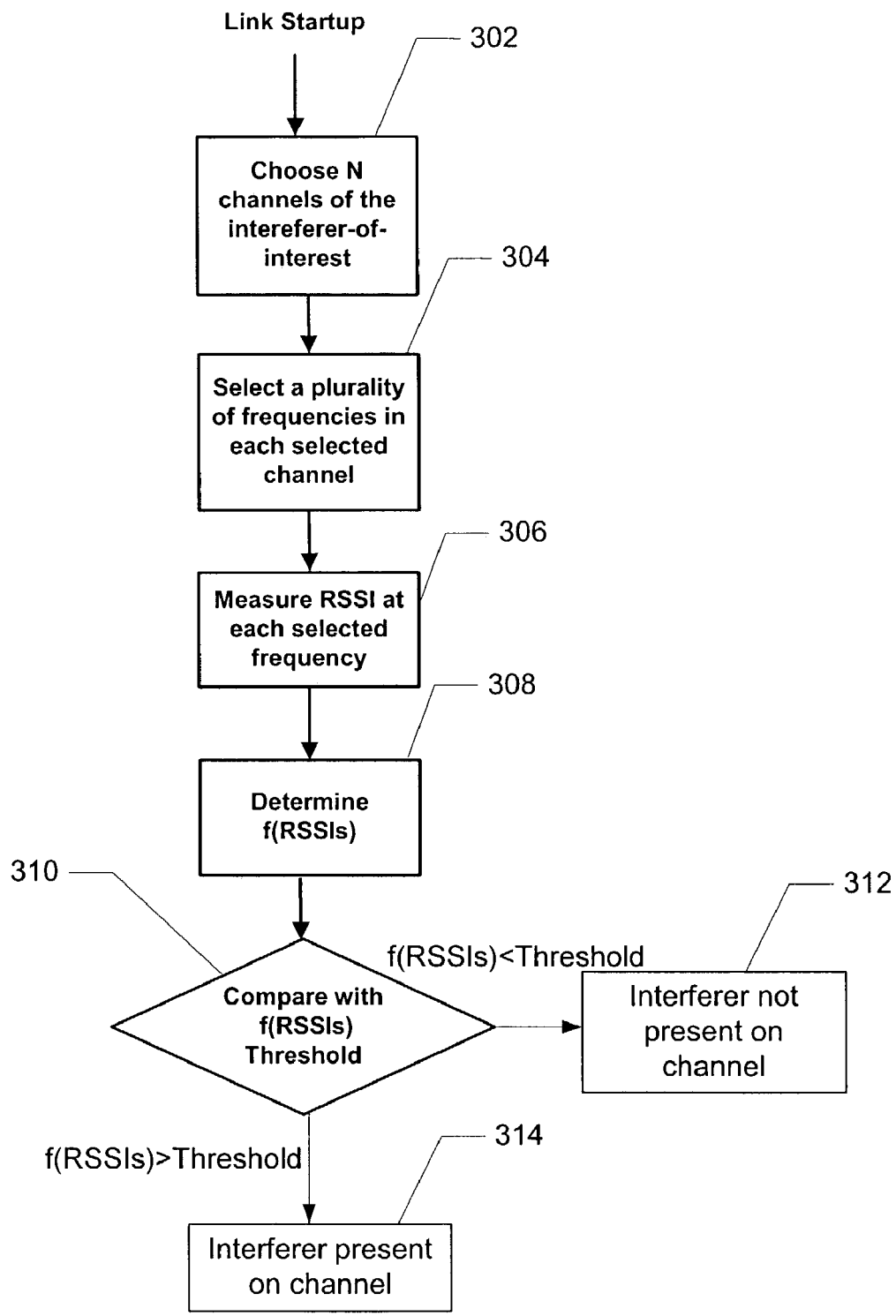
FIG. 3 is a flow chart for a method for identifying an interferer in a communication channel according to another embodiment of the present invention.

FIG. 3 is a flow chart for a method for identifying an interferer in a communication channel using a plurality of frequencies per channel according to an embodiment of the present invention. In step 302, N channels in which the interferer is likely to operate are selected. For example, three channels of 802.11b (channels 1, 6 and 11) can be selected in step 302. Any N channels can be selected. Selection can be by the user or predetermined.

In step 304, a plurality of frequencies is selected in each selected channel at which to determine a received signal strength indication (RSSI). The number of frequencies selected per channel can be the same from channel to channel or different from channel to channel. The frequencies can be selected using a priori knowledge of the interferer such as channel structure, channel frequency and channel bandwidth.

In step 306, RSSI is measured at each of the selected frequencies. In one embodiment of the present invention, RSSI is measured by tuning the receiver to each particular channel (or frequency) for a short period of time. Any interferers present within the tuning bandwidth are downconverted to intermediate frequency by the receiver. A received signal strength indication (RSSI) is measured at the downconverted intermediate frequency. The RSSI can be determined for all frequencies prior to continuing to step 308 or for one or more of the frequencies prior to continuing to step 308.

In step 308, a function of the measured RSSIs is determined to generate a function RSSI value. The function can calculated for RSSI measurements in each channel basis or for all of the measured RSSIs as a whole. Any function of the RSSIs can be used and an exemplary function is described below. The function RSSI value is compared to an RSSI function threshold. The RSSI function threshold can be predetermined or dynamically adjustable. A dynamically adjustable RSSI function threshold allows the present invention to be adjusted for a particular environment. If the value of the function determined in step 308 does not exceed the RSSI function threshold, the interferer is deemed not present in step 312. If the value of the function determined in step 308 exceeds the RSSI function threshold, the interferer is deemed not present in step 314.

In one embodiment of the present invention, the function in step 308 determines the percentage of RSSIs that exceed an RSSI threshold on a channel-by-channel basis. The RSSI threshold can be predetermined or dynamically adjustable. A dynamically adjustable RSSI threshold allows the present invention to be adjusted for a particular environment. Thus, for each channel, the measured RSSI for each frequency is compared to an RSSI threshold. A percentage of the number of RSSI measurements exceeding the RSSI threshold is determined for each channel. If the percentage of measured RSSI values exceeding the RSSI threshold for a particular channel exceeds an RSSI channel threshold, the interferer is deemed present on that channel. The RSSI channel threshold can be predetermined or dynamically adjusted to respond to environmental factors. To save computation, the number of RSSIs exceeding the RSSI threshold can be used instead of the percentage.

The percentage of measurements that have to exceed the RSSI channel threshold to identify that the interferer is present is chosen in accordance with the performance requirements of the system. A higher percentage requirement is likely to lead to a lower likelihood of a falsely indicating that an interferer is present when in fact it is not. However, the higher percentage requirement is also more likely to not identify a particular interferer when, in fact, it is present. Likewise, a lower percentage requirement is likely to lead to a lower likelihood of not identifying an interferer when it is present. However, the lower percentage requirement is more likely to identify a particular interferer as being present, when in fact it is not.

For example, assume that the predetermined percentage is fifty percent and 6 frequencies are selected for measuring RSSI in channel 1 and 7 frequencies are selected for measuring RSSI in channel 6. The interferer is deemed present and identified in channel 6 if at least 3 of the RSSI measurements exceed the predetermined threshold. The interferer is deemed present in channel 7 if at least 4 of the RSSI measurements exceed the predetermined threshold.

Another function that can be used is the sum of the calculated RSSIs. The sum can be calculated on a per channel basis or on an overall basis. If the value of the sum of RSSIs exceeds a threshold, the interferer is deemed to be present.

Interferers are often dynamic in nature. For example, some interferers are not present continuously or are not active at the time of the RSSI measurement. For example, 802.11b is a time division duplex (TDD) signal. As such, 802.11b is only on during transmission. At other times, the transmitter is turned off. If an RSSI measurement were made during an off-time, the system could erroneously indicate that there is no interferer present.

To increase the likelihood of detecting and identifying dynamic interferers, detection and identification of interferers as described above can be repeated. For example, in one embodiment of the present invention, detection and identification is performed on a periodic basis. In another embodiment of the present invention, detection and identification of interferers is performed at random intervals. In yet another embodiment of the present invention, detection and identification of interferers is performed according to a schedule.

In addition to repeating processing, RSSI measurements can be performed in a random fashion in step 308 to increase the likelihood of detecting and identifying dynamic interferers. The RSSI measurement can be randomized in a number of ways. For example, in one embodiment of the present invention, RSSI can be measured for the selected frequencies in a random order. Moreover, the RSSI measurements do not have to be made for all of the frequencies in one channel prior to making RSSI measurements for frequencies in another channel.

In addition to randomizing RSSI measurements, RSSI measurements for each of the plurality of frequencies can be performed at different times to increase the likelihood of detecting and identifying interferers. In this manner it is more likely at least some, if not all, of the RSSI measurements are made during a time when an interferer is present.

The RSSI measurements described above to be used to identify the presence of an interferer can be taken at a number of points. For example, in one embodiment of the present invention, the RSSI measurements are taken at link startup, for example, when a cellular telephone handset is turned on. In an alternative embodiment of the present invention, the measurements can be made in the background. In another alternative embodiment of the present invention, the RSSI measurements are made at the end of each call. Making the measurements in the background and/or at the end of each call has the advantage of accounting for the dynamic nature of interfering signals.

Figure 4:
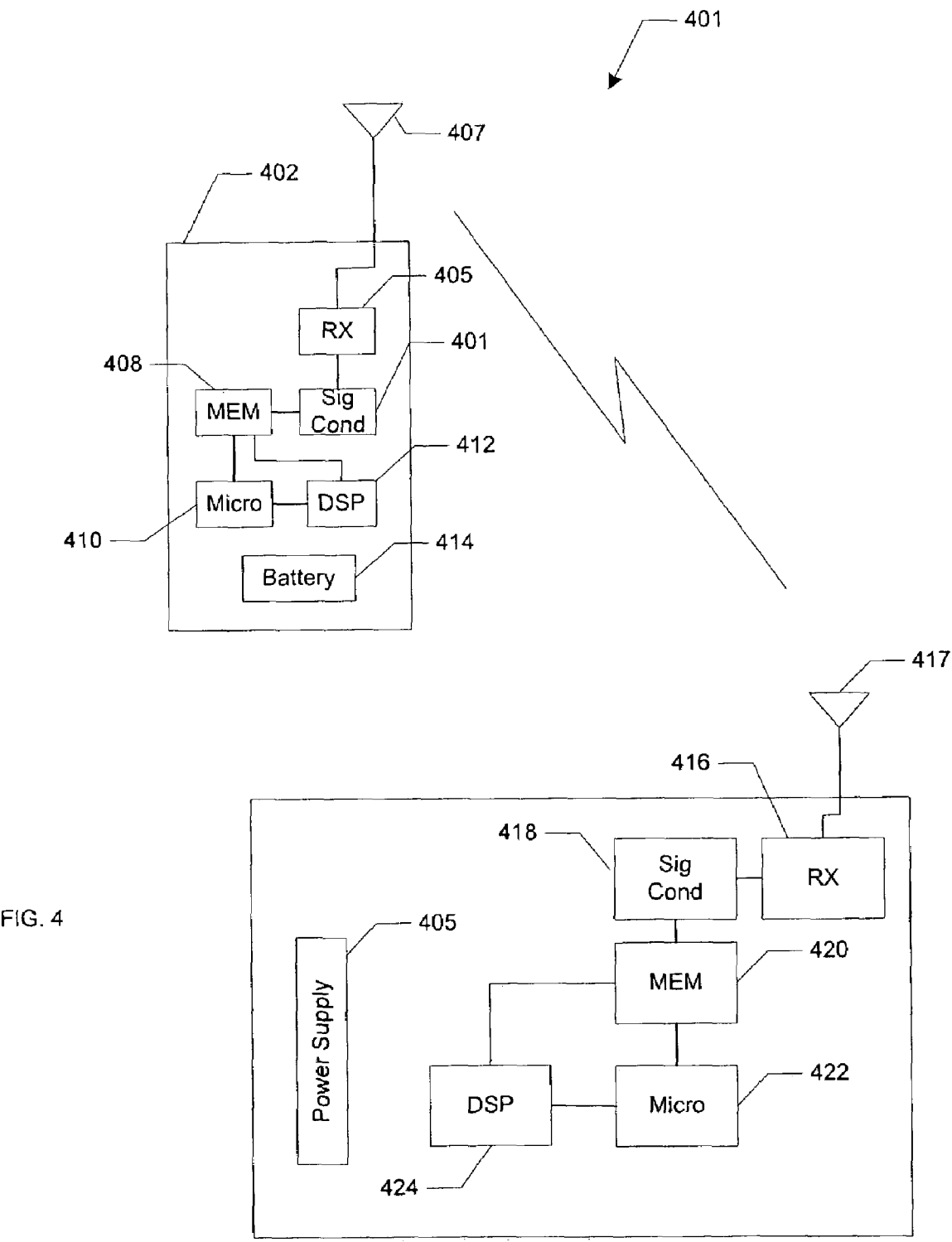
FIG. 4 is a schematic diagram of a cordless telephone system according to an embodiment of the present invention.

FIG. 4 is a schematic diagram illustrating a cordless telephone system 401 for identifying interferers in accordance with an embodiment of the present invention. Cordless telephone system includes a cordless telephone handset 402 and a cordless telephone base unit 404.

Cordless telephone handset 402 includes a receiver 405 tuned to receive a signal at a selected frequency through an antenna 407. In an embodiment of the present invention, the received signal is conditioned and digitized by a signal conditioning unit 406. The digitized signal is stored in a memory 408. A microprocessor 410 is programmed to control processing in accordance with an embodiment of the present invention as described above. User or predetermined channel selection can be controlled by microprocessor 410. A digital signal processing element 412 can be included to assist microprocessor in performing its functions. Power is supplied to the various components of cordless telephone handset 402 by a batter 414.

Cordless telephone base unit 404 includes a receiver 416 tuned to receive a signal at a selected frequency through an antenna 417. In an embodiment of the present invention, the received signal is conditioned and digitized by a signal conditioning unit 418. The digitized signal is stored in a memory 420. A microprocessor 422 is programmed to control processing in accordance with an embodiment of the present invention as described above. User or predetermined channel selection can be controlled by microprocessor 422. A digital signal processing element 424 can be included to assist microprocessor in performing its functions. Power is supplied to the components of base unit 404 by a power supply 426.

Cordless telephone handset 402 includes a receiver 405 tuned to receive a signal at a selected frequency through an antenna 407. In an embodiment of the present invention, the received signal is conditioned and digitized by a signal conditioning unit 406. The digitized signal is stored in a memory 408. A microprocessor 410 is programmed to control processing in accordance with an embodiment of the present invention as described above. User or predetermined channel selection can be controlled by microprocessor 410. A digital signal processing element 412 can be included to assist microprocessor in performing its functions. Power is supplied to the various components of cordless telephone handset 402 by a battery 414.

To reduce cost, complexity and weight of the handset as well as to reduce power consumption to preserve battery 414, in another embodiment of the present invention, handset 402 sends its RSSI measurements to base unit 404 for processing. Base unit 404 uses the RSSI measurements to identify any interferers. Base unit 404 can then send instructions to handset 402 to avoid the interferers.

In another embodiment of the present invention, handset 402 sends the collected signal stored in memory 408 to base unit 404. Base unit 404 determines RSSI from the collected signals and uses the determined RSSI to identify any interferers. Base unit 404 can then send instructions to handset 402 to avoid the interferers.

As described above, the frequencies at which to make the RSSI measurements are determined based on the structure of the interferer. Thus, RSSI measurements or functions of RSSI measurements meeting the predetermined thresholds for the selected frequencies provide an indication that the interferer having the structure giving rise to the selection of the test frequencies is present. In this manner, an embodiment of the present invention acts not only to indicate that an interferer is present, but also the identify the interferer. For example, in the case of 802.11b, if the predetermined percentage of RSSI measurements made at frequencies selected according to where 802.11b is expected to be present exceed the pre-determined threshold, then a positive identification of 802.11b has been made.

Other metrics for detecting the presence of interferers in a radio communication band can be used other than RSSI. For example, in another embodiment of the present invention, interference detection occurs when a regular (voice connection) or specific service call is established. When the call is established, synchronization and/or other errors can be monitored in the band in which the call is established. Such error monitoring can be based on the protection field mechanism, cyclic redundancy checks (CRCs) or other error monitoring techniques. If the number of errors exceeds a threshold, an interferer is deemed present in the channel. The threshold can be predetermined or dynamically adjusted to adjust to environmental conditions.

In addition, other methods for detecting the presence of an interferer can be used other than threshold detection. For example, in another embodiment of the present invention, power in a wider spectrum of several related channels in which the interferer may be present is measured. The shape of the resulting power spectral density measurement can be compared to known interferers to detect the presence of an interferer. That is if the shape of the power density measurement matches the shape of a known interferer's power spectral density to within a tolerance, the interferer having the power spectral density that matches shape with the measured power spectral density is deemed present. The tolerance can be predetermined or dynamically adjusted.

In another embodiment of the present invention, an estimate of the power spectral density of a wideband interferer is obtained by measuring RSSI on a number of narrowband channels on which the wideband interferer is likely to be present. The RSSI measurements are used to estimate the shape of the power spectral density of a wideband interferer that might be present. The estimated power spectral density can be compared to power spectral densities for known interferers to detect and identify an interferer. As described above, the RSSI measurements can be randomized or spread out in time to increase the likelihood of measuring an interferer if it is present.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for identifying an interferer in a cordless telephone communication band, comprising:
    selecting N channels characteristics of the interferer;
    selecting a plurality of frequencies within each of the selected N channels;
    measuring a power spectral density in a bandwidth where the interferer is expected by measuring an RSSI at each of the selected frequencies within each of the selected N channels and calculating a function value dependent upon the measured RSSIs at each of the selected frequencies; and
    identifying the interferer if the function value exceeds a threshold in accordance with the measured power spectral density.

2. The method recited claim 1, further comprising selecting frequencies for measuring RSSI independent of previous measurements.

3. The method recited in claim 1, further comprising measuring RSSI for all selected plurality of frequencies in one channel prior to measuring RSSI for any frequency in another channel.

4. The method recited in claim 1, further comprising measuring RSSI for any frequency in any channel regardless of whether RSSI has been measured for all selected plurality of frequencies in a particular channel.

5. The method recited in claim 1, further comprising measuring RSSIs substantially simultaneously.

6. The method recited in claim 1, further comprising not measuring RSSIs substantially simultaneously.

7. The method recited in claim 1, wherein the threshold is predetermined.

8. The method recited in claim 1, wherein the threshold is dynamically adjustable.

9. A cordless telephone system for identifying an interferer in a cordless telephone communication band, comprising:
    a handset comprising:
        a receiver to receive a signal at a particular frequency, the frequency determined using one or more known characteristics of the interferer;
        a signal conditioning unit to process and digitize the signal;
        a memory to store the digitized signal;
        a first microprocessor to measure a power spectral density in a bandwidth where the interferer is expected and to identify the interferer in accordance with the measured power spectral density; and
    a base unit in communication with the handset, wherein the base unit comprises:
        a receiver to receive a signal at a second particular frequency, the frequency determined using one or more known characteristics of the interface;
        a signal conditioning unit to process and digitize the signal;
        a memory to store the digitized signal; and
        a second microprocessor to measure a power spectral density in a bandwidth where the interferer is expected and to identify the interferer in accordance with the measured power spectral density.

10. The cordless telephone system recited in claim 9, wherein the first microprocessor is further configured to measure an RSSI at the particular frequency, compare the RSSI to a threshold, and identify the interferer if the RSSI exceeds the threshold.

11. The cordless telephone system recited in claim 9, wherein the second microprocessor is further configured to measure an RSSI at the second particular frequency, compare the RSSI to the threshold and identify the interferer if the RSSI exceeds the threshold.

12. A method for identifying an interferer in a radio communication band, said method comprising:
   selecting a plurality of test channels in accordance with a channel structure of the interferer;
   selecting a frequency in each selected channel;
   measuring a power spectral density in a bandwidth where the interferer is expected by measuring an RSSI at the selected frequency in each selected channel and calculating a function value dependent upon the measured RSSIs at the selected frequency;
   identifying the interferer in accordance with the measured power spectral density.

13. The method recited in claim 12, further comprising
   comparing the shape of the measured power spectral density with shapes of power spectral densities for known interferers; and
   determining if there is a match in shape.

14. The method recited in claim 12, further comprising measuring the power spectral density by estimating the power spectral density using a plurality of narrowband RSSI measurements.

15. The method recited in claim 14, further comprising randomizing the RSSI measurements.

16. The method recited in claim 14, further comprising varying a time of the RSSI measurements.

17. The method recited in claim 12, further comprising:
   measuring an RSSI associated with the selected frequency in each selected channel; and
   comparing each measured RSSI to a threshold; and
   identifying the interferer in accordance with the measured RSSI.

18. The method recited in claim 17, further comprising:
   determining a percentage of measured RSSIs that exceed the threshold; and
   comparing the percentage to an RSSI channel percentage threshold.

19. The method recited in claim 17, further comprising:
   selecting at least one additional frequency in each selected channel; and
   measuring an RSSI corresponding to each additional selected frequency.

20. The method recited in claim 19, further comprising:
   comparing each measured RSSI to the threshold;
   determining a percentage of measured RSSIs that exceed the threshold; and comparing the percentage to an RSSI channel percentage threshold.

21. The method recited in claim 19, further comprising:
   comparing each measured RSSI to a threshold for each selected channel;
   determining a percentage of measured RSSIs that exceed the threshold for each selected channel; and
   comparing the percentage to an RSSI channel percentage threshold for each selected channel.

22. The method recited in claim 19, further comprising:
   calculating a function of the measured RSSIs to generate an function RSSI value; and
   comparing the function RSSI value to a function RSSI threshold.

23. The method recited in claim 22, where in the function is a sum of the measured RSSIs.

24. The method recited in claim 22, wherein the function is a sum of measured RSSIs for each selected channel.

25. The method recited in claim 17, further comprising:
   adjusting the threshold; and
   comparing each measured RSSI to the adjusted threshold.

26. The method recite in claim 17, further comprising comparing each measured RSSI to a predetermined threshold.

27. A system for identifying an interferer in a radio communication band, said method comprising:
   means for selecting a plurality of test channels in accordance with a channel structure of the interferer;
   means for selecting a frequency in each selected channel;
   means for measuring a power spectral density in a bandwidth where the interferer is expected by measuring an RSSI at the selected frequency in each of the selected channel and calculating a function value dependent upon the measured RSSIs at the selected frequency; and
   means for identifying the interferer in accordance with the measured power spectral density.

28. The system recited in claim 27, further comprising
   means for comparing the shape of the measured power spectral density with shapes of power spectral densities for known interferers; and
   means for determining if there is a match in shape.

29. The system recited in claim 27, further comprising means for measuring the power spectral density by estimating the power spectral density using a plurality of narrowband RSSI measurements.

30. The system recited in claim 29, further comprising means for randomizing the RSSI measurements.

31. The system recited in claim 29, further comprising means for varying a time of the RSSI measurements.

32. The system recited in claim 27, further comprising:
   means for measuring an RSSI associated with the selected frequency in each selected channel;
   means for comparing each measured RSSI to a threshold; and
   means for identifying the interfere in accordance with the measured RSSI.

* * * * *